United States Patent [19]

Utagawa

[11] Patent Number: 5,422,701
[45] Date of Patent: Jun. 6, 1995

[54] FOCUS DETECTION APPARATUS

[75] Inventor: Ken Utagawa, Yokohama, Japan

[73] Assignee: Nikon Corporation, Tokyo, Japan

[21] Appl. No.: 170,982

[22] Filed: Dec. 21, 1993

Related U.S. Application Data

[63] Continuation of Ser. No. 7,357, Jan. 21, 1993, abandoned, which is a continuation of Ser. No. 761,999, filed as PCT/JP91/00101, Jan. 29, 1991, published as WO91/11742, Aug. 8, 1991, abandoned.

[30] Foreign Application Priority Data

Jan. 30, 1990 [JP] Japan ................... 2-20058

[51] Int. Cl.⁶ .............................................. G03B 13/36
[52] U.S. Cl. ............................................... 354/406
[58] Field of Search ............... 354/402, 406, 407, 408; 250/201.2, 201.8

[56] References Cited

U.S. PATENT DOCUMENTS

| | | | |
|---|---|---|---|
| 4,560,863 | 12/1985 | Matsumura et al. | 354/407 X |
| 4,855,777 | 8/1989 | Suda et al. | 354/402 |

FOREIGN PATENT DOCUMENTS

| | | |
|---|---|---|
| 0351855 | 1/1990 | European Pat. Off. |
| 55-115020 | 9/1980 | Japan |
| 56-32126 | 4/1981 | Japan |
| 557-125912 | 8/1982 | Japan |
| 58-194007 | 11/1983 | Japan |
| 60-37513 | 2/1985 | Japan |
| 63-163418 | 7/1988 | Japan |
| 63-172207 | 7/1988 | Japan |
| 63-172209 | 7/1988 | Japan |
| 63-246709 | 10/1988 | Japan |
| 63-286830 | 11/1988 | Japan |

*Primary Examiner*—W. B. Perkey
*Attorney, Agent, or Firm*—Shapiro and Shapiro

[57] ABSTRACT

A focus detection apparatus for, e.g., a camera, can perform focus detection of even a position separated from an optical axis of an exchangeable photographing lens in a direction perpendicular to the optical axis regardless of an exit pupil position of the photographing lens. A detection image range used in focus detection is limited to a small region smaller than a detection image range of a conventional re-imaging type apparatus, and the way of setting use regions on an image sensor is changed in accordance with an exit pupil position of a photographing lens, and an aperture position of a re-imaging lens (a position separated from the optical axis in a direction perpendicular to the optical axis), i.e., a region changing means for changing the way of setting an image shift calculation region for comparing an image shift is provided, thereby allowing focus detection free from an eclipse.

6 Claims, 12 Drawing Sheets

OPTICAL AXIS OF PHOTOGRAPHING LENS

OPTICAL AXIS OF PHOTOGRAPHING LENS

FOCUS DETECTION APPARATUS

This is a continuation of application Ser. No. 007,357 filed Jan. 21, 1993, now abandoned, which is a continuation of application Ser. No. 761,999 filed as PCT/JP91/00101, Jan. 29, 1991, published as WO91/11742, Aug. 8, 1991, now abandoned.

TECHNICAL FIELD

The present invention relates to a focus detection apparatus or a distance measurement apparatus for, e.g., a camera.

BACKGROUND ART

Figure 14:
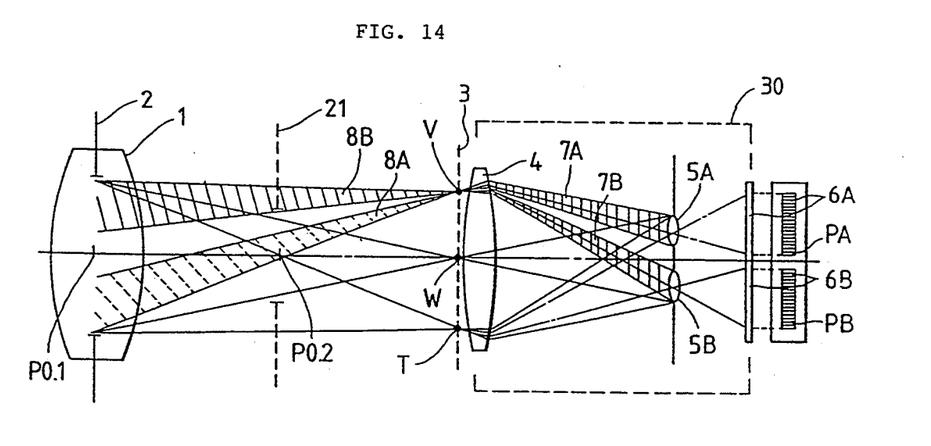
FIG. 14 is a schematic diagram of a conventional re-imaging type focus detection optical system.
Figure 15:
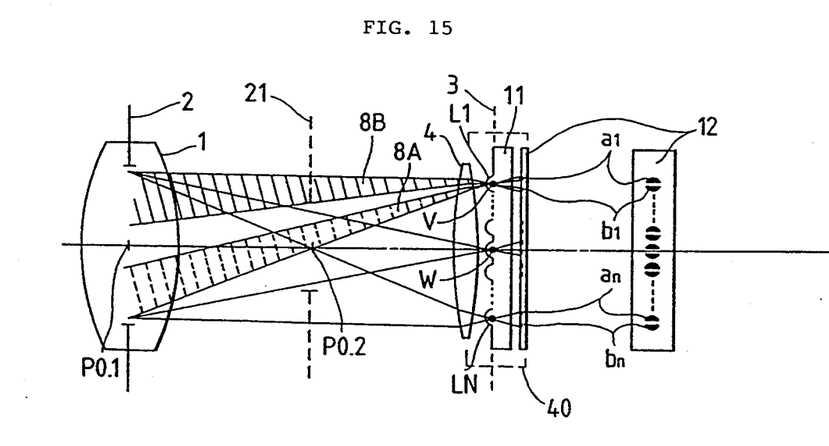
FIG. 15 is a schematic diagram of a conventional TCL type focus detection optical system.

As conventional focus detection apparatuses for, e.g., a camera, a re-imaging type apparatus shown in FIG. 14, and a lens array type apparatus shown in FIG. 15 are known.

More specifically, light beams 8A and 8B passing through an exit pupil 2 of a photographing lens 1 become incident on a point V on a focus detection plane 3. Thereafter, in FIG. 14, the beams become incident on points PA and PB on image sensors 6A and 6B through re-imaging lenses 5A and 5B. Therefore, as is well known, a shift between images on the image sensors 6A and 6B can be detected to determine the relationship between the focus detection plane 3 and a focal plane.

In FIG. 15, the light beams 8A and 8B become incident on light-receiving sensors a1 and b1 via a lenslet L1 arranged near the focus detection plane 3 and located at the point V. Therefore, as is well known, a shift between an image obtained by a light-receiving sensor array a1, . . . , an and an image obtained by a light-receiving sensor array b1, . . . , bn can be detected to determine the relationship between the focus detection plane 3 and a focal plane.

[Problem to be Solved by the Invention]

In either case, however, since a position (setup pupil position), on the optical axis, of a detection pupil used in focus detection is fixed at a position P0.1, a photographing lens free from an eclipse is limited. The setup pupil position is a conjugate position for a field lens 4 of the re-imaging lenses 5A and 5B in FIG. 14, or a position where a projection image from the sensors a1 to an and a projection image from the sensors b1 to bn overlap each other in FIG. 15. Since various photographing lenses, i.e., photographing lenses having exit pupils at different positions are mounted on a camera body having such a focus detection apparatus, focus detection may be disabled for the following reasons.

For example, when the setup pupil position of the exit pupil 2 of the photographing lens is the position P0.1, no eclipse occurs at a point W on the focus detection plane 3 near the optical axis of the photographing lens and even at the point V separated from the optical axis. However, when an exit pupil 21 is present at a position P0.2 separated from the setup pupil position although a full-open F number remains the same, the light beam 8B causes an eclipse at the point V separated from the optical axis, and focus detection is disabled.

This drawback becomes more conspicuous as the point V to be subjected to focus detection is separated farther from the optical axis of the photographing lens, and as the exit pupil position of the photographing lens is separated farther from the setup pupil position.

In the re-imaging type apparatus shown in FIG. 14, when an image range (V to T) detected by the re-imaging lenses is widened, a focus detection apparatus 30 becomes bulky as compared to a lens array type apparatus 40 (FIG. 15).

It is the first object of the present invention to provide a focus detection apparatus which can perform focus detection at a position separated from the optical axis of an exchangeable photographing lens in a direction perpendicular to the optical axis regardless of an exit pupil position of the photographing lens.

It is the second object of the present invention to provide a focus detection apparatus which does not require a large space as compared to a conventional re-imaging type focus detection apparatus.

Disclosure of Invention

In order to achieve the above objects, according to the present invention, a detection image range used in focus detection is limited to a small region smaller than a detection image range of a conventional re-imaging type apparatus, and the way of setting use regions on an image sensor is changed in accordance with the position of an exit pupil of a photographing lens and an aperture position (a position separated from the optical axis in a direction perpendicular to the optical axis) of a re-imaging lens, that is, a region changing means for changing the way of setting an image shift calculation region for comparing an image shift is provided, thus allowing focus detection free from an eclipse.

BRIEF DESCRIPTION OF DRAWINGS

FIGS. 1 to 6 show an embodiment of the present invention, in which

FIGS. 7 to 13 show another embodiment of the present invention, in which

PRINCIPLE OF INVENTION

The principle will be explained below with reference to FIGS. 4A and 4B.

Figure 4A:
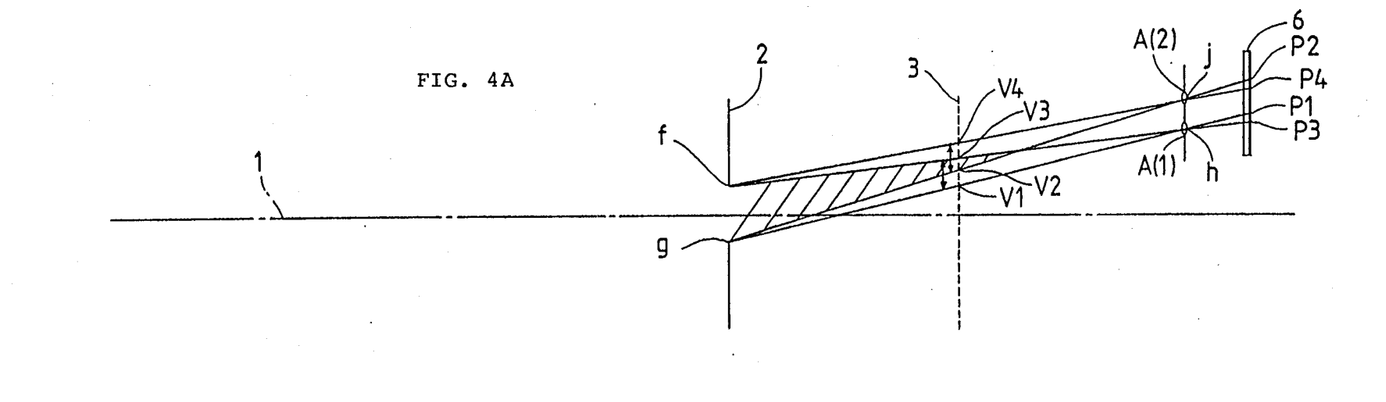
Figure 4B:
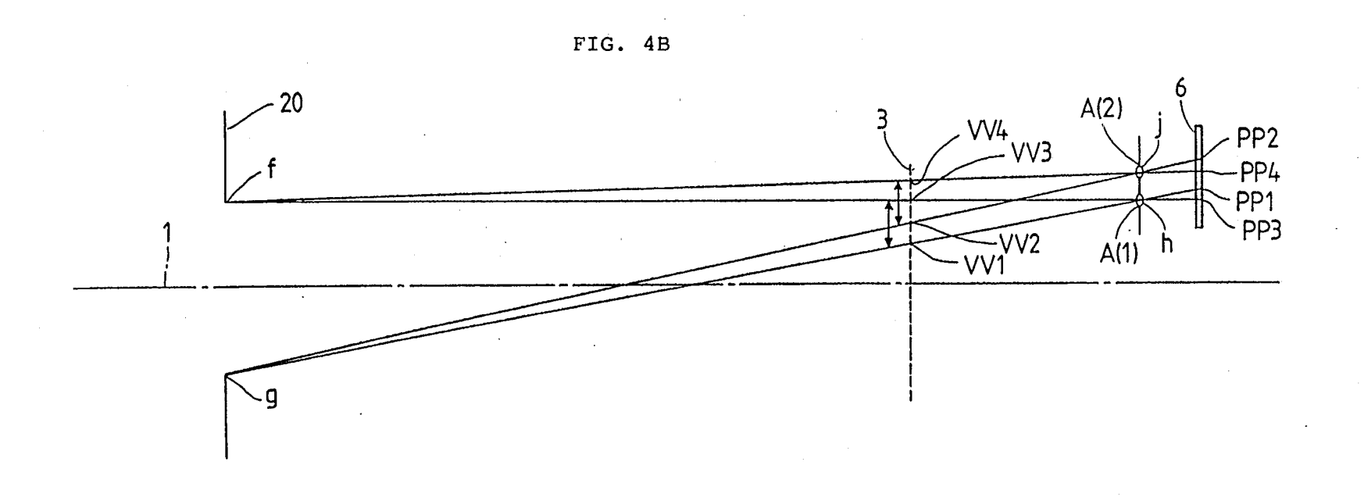

FIG. 4A shows a case wherein an exit pupil position 2 of a mounted photographing lens is near a focus detection plane 3 which is a predetermined imaging plane where the photographing lens is to be focused, and FIG. 4B shows a case wherein the exit pupil position 20 is far from the focus detection plane. (FIGS. 4A and 4B exemplify a case wherein the photographing lenses have almost equal F numbers with respect to the predetermined imaging plane.)

Since aperture portions A(1) and A(2) of a re-imaging lens arranged behind the predetermined imaging plane 3 and a chip portion 6 where an image sensor is formed are fixed at predetermined positions in a body regardless of photographing lenses to be exchanged, a diverging range of light beams passing through the aperture portions A(1) and A(2) via an exit pupil aperture 2 or 20 is as shown in FIGS. 4A or 4B in each case.

As can be seen from the drawings, in FIG. 4A, since light beams in a range between V2 and V3 on the focus detection plane become incident on both the aperture portions A(1) and A(2), and form images in image sensor portions P3 to P1 and P4 to P2 without an eclipse, image shift detection can be performed, and the range between V2 and V3 serves as a small region as a detection image range.

In FIG. 4B, since light beams in a range between VV2 and VV3 on the focus detection plane become incident on both the aperture portions A(1) and A(2), and form images in image sensor portions PP3 to PP1 and PP4 to PP2 without an eclipse, image shift detection can be performed, and the range between VV2 and VV3 serves as a small region as a detection image range.

Figure 4C:
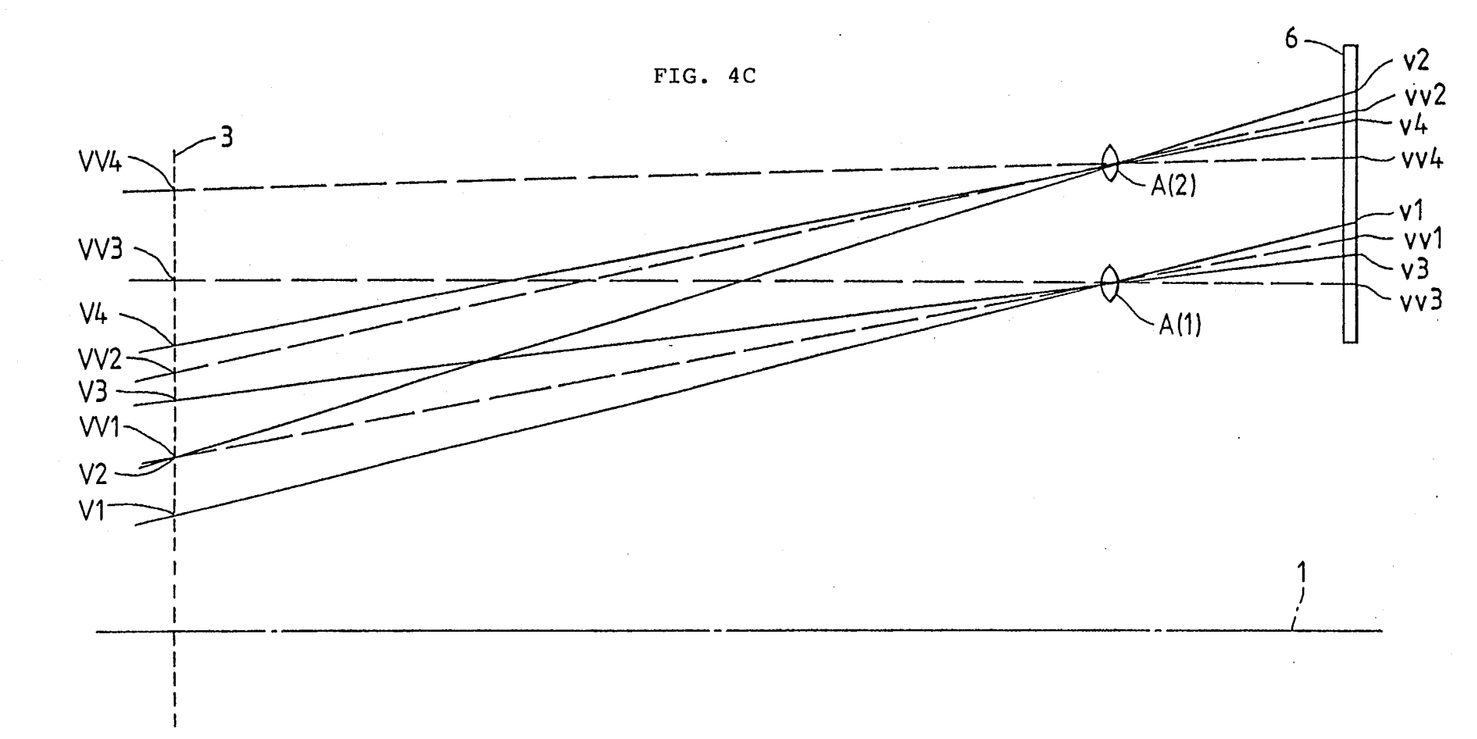

FIG. 4C illustrates the systems between the focus detection plane 3 and a sensor surface 6 shown in FIGS. 4A and 4B to overlap each other. The small regions of the detection image ranges corresponding to the respective exit pupil positions are quite different from each other like (v2 to v3) vs. (vv2 to vv3). Similarly, the small regions of the detection image ranges are also different from each other in accordance with the distances between an optical axis 1 of the photographing lens and the apertures A(1) and A(2).

Therefore, the present applicant paid attention to the fact that an apparatus capable of performing precise focus detection regardless of an exit pupil position can be provided if a small region as the detection image range can be set in accordance with the exit pupil position, and the distance from optical axis 1 of the photographing lens to the aperture position, and focus detection can be performed on the basis of photoelectric outputs from the image sensor portions in the small region.

Figure 4D:
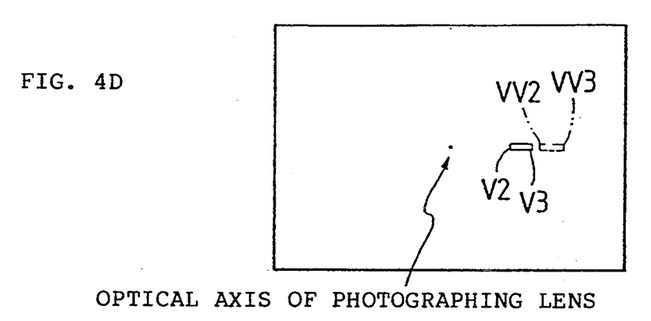
FIGS. 4D to 4G are explanatory views for explaining focus detection regions on a film surface.

FIG. 4D illustrates the small regions (V2 to V3) and (vv2 to vv3) in FIGS. 4A and 4B on a film surface. In this manner, even when a pair of re-imaging optical systems having the same aperture positions A(1) and A(2) are used, a setup small region is changed in accordance with an exit pupil position of a mounted photographing lens, so that focus detection can be performed without being influenced by an eclipse.

When a region changing means is provided, the way of setting an image shift calculation region on an image sensor is changed in accordance with the exit pupil position and the distance from the optical axis 1 of the photographing lens to the aperture position, thereby allowing focus detection regardless of the exit pupil position of the photographing lens.

Figure 1:
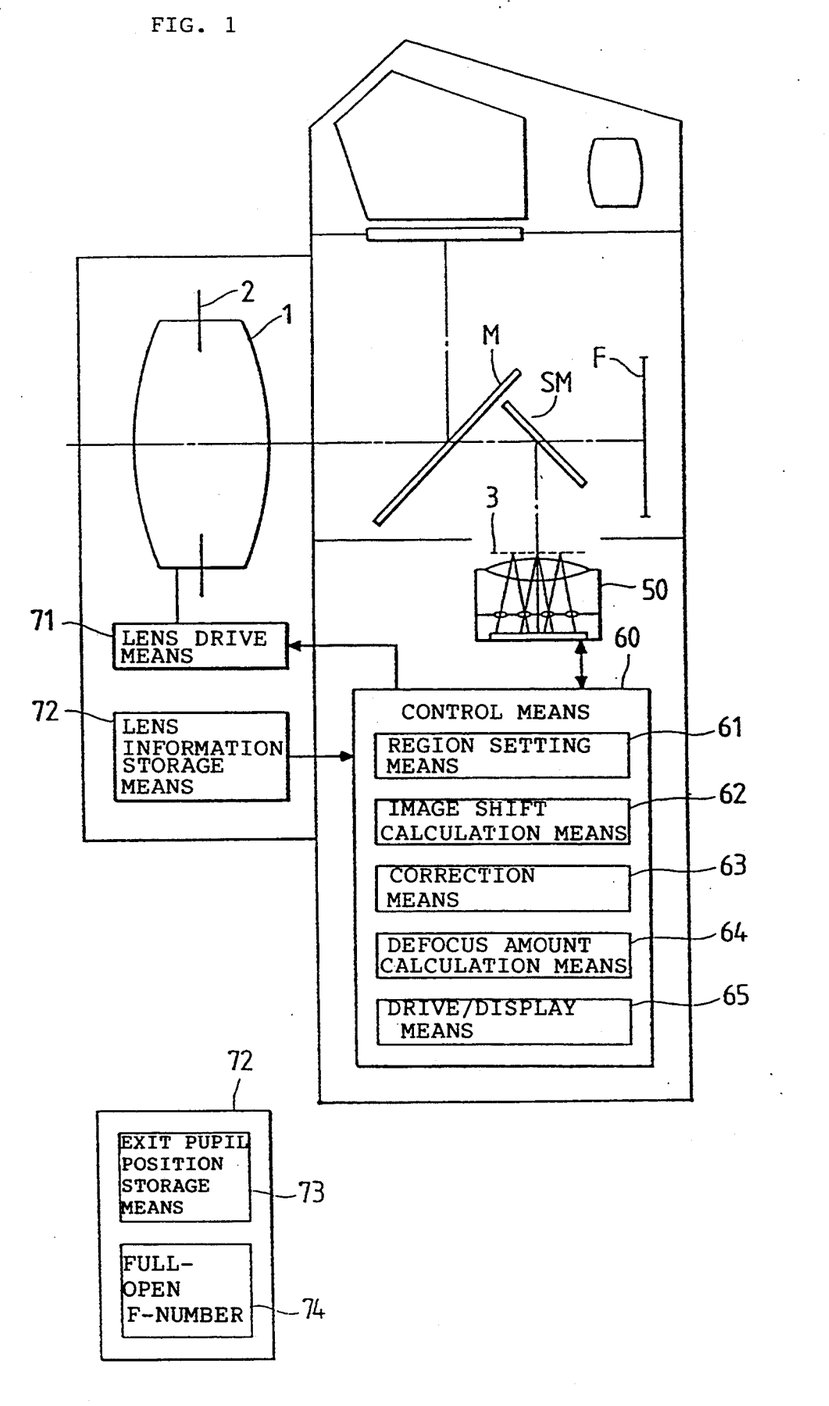
FIG. 1 is a block diagram of a camera.
Figure 2:
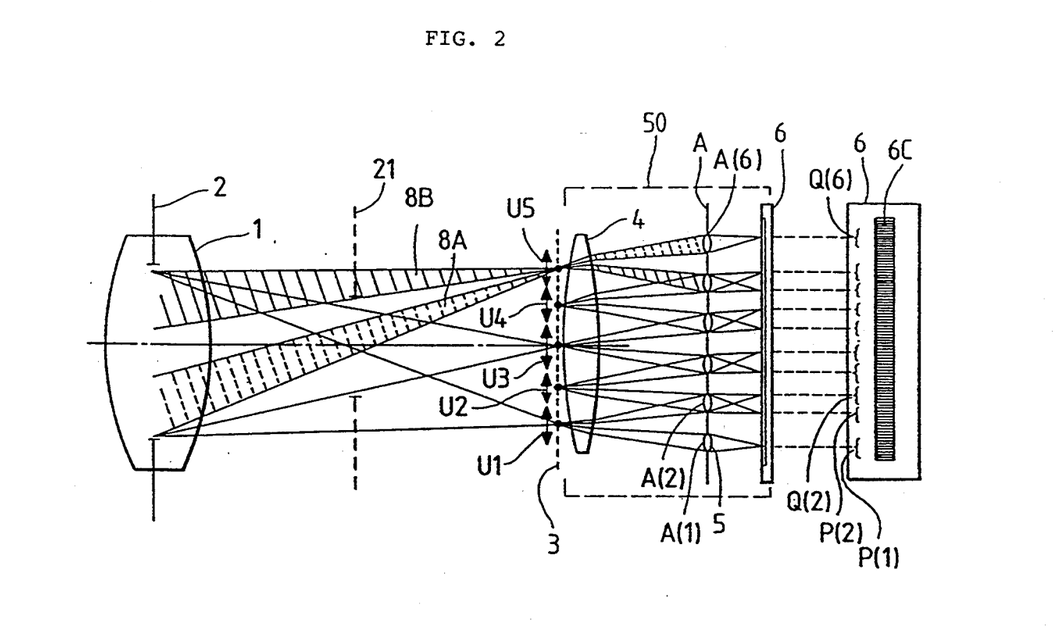
FIG. 2 is a schematic diagram of a focus detection optical system shown in FIG. 1.
Figure 3:
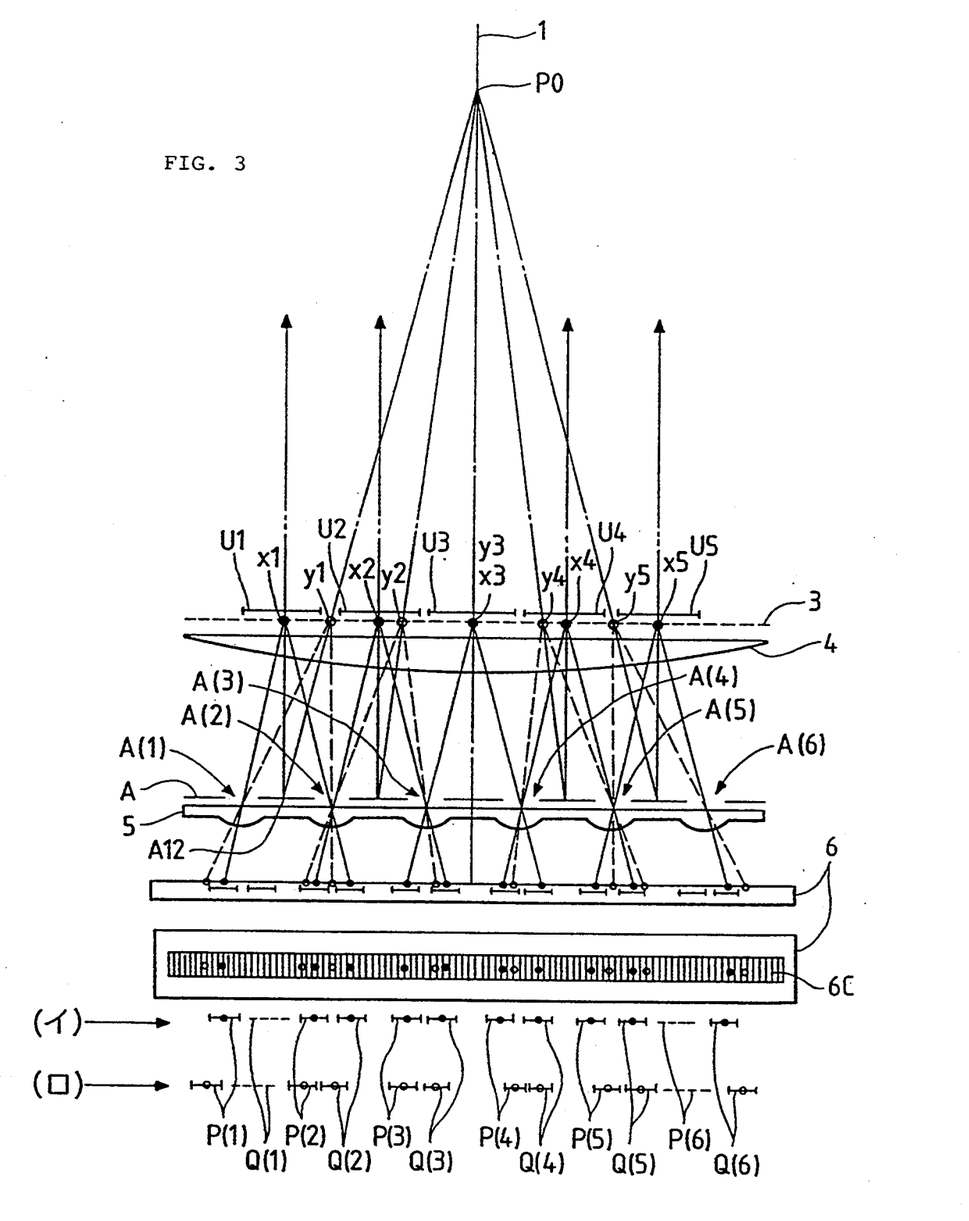
FIG. 3 is a detailed diagram of a focus detection apparatus 50 shown in FIG. 2, FIGS. 4A to 4C are explanatory views for explaining detection image regions on an image sensor at different exit pupil positions, respectively.

More specifically, as shown in FIG. 2, re-imaging lenses 5 are arranged near a plurality of aperture portions A(1) to A(6) of a mask A to face small regions (U1, U2, U3, U4, U5), and a chip portion 6 where an image sensor 6C is formed is arranged behind the re-imaging lenses 5. As shown in FIG. 3, a plurality of small regions (U1, U2, U3, U4, U5) are arranged, and image shift calculation regions P(i) and Q(i) on the image sensor 6C are changed by a region changing means in accordance with the exit pupil position and the distances from the optical axis of the photographing lens 1 to the aperture positions A(1) to A(6), so that a focus detection region as wide as a conventional apparatus can be covered. In this case, a focus detection apparatus 50 (FIGS. 1 and 1) can be rendered compact as compared to a conventional re-imaging type apparatus (the focus detection apparatus 30 shown in FIG. 14).

In this manner, according to the present invention, focus detection can be performed in a region which is separated from the optical axis of a photographing lens in a direction perpendicular to the optical axis although such focus detection cannot be performed in a conventional apparatus.

Embodiments

FIGS. 1 to 6 show an embodiment of the present invention.

Figure 4E:
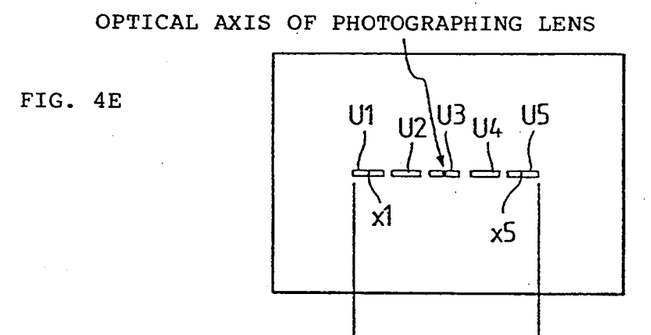
Figure 4F:
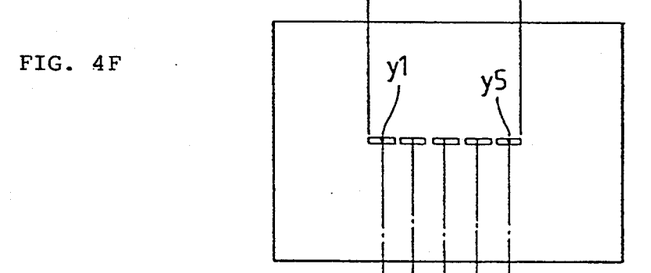
Figure 4G:
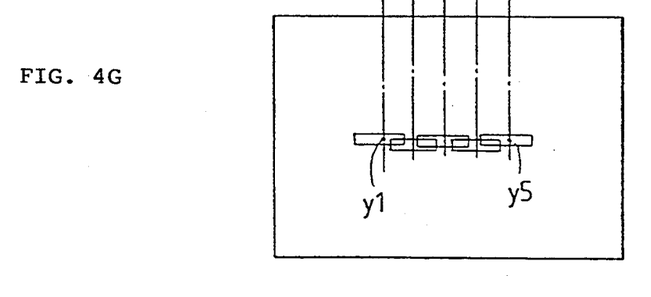
Figure 5A:
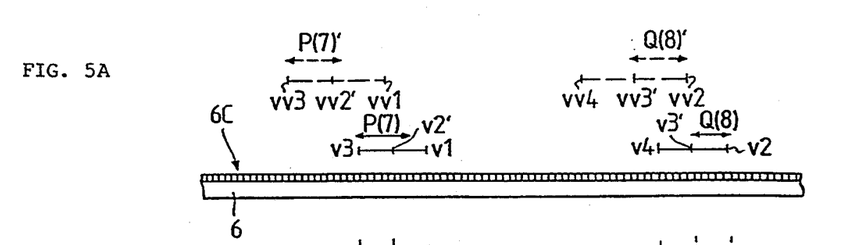
FIGS. 5A to 5E are explanatory views of an image sensor 6C.
Figure 5B:
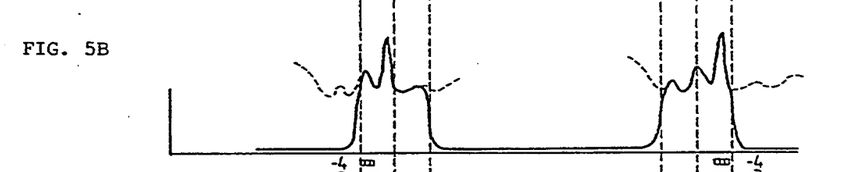
Figure 5C:
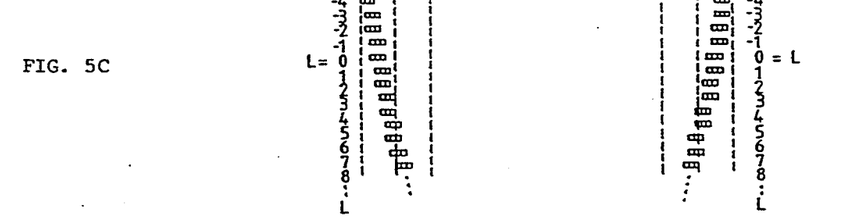
Figure 5D:
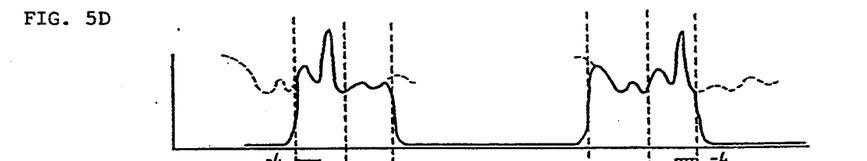
Figure 5E:
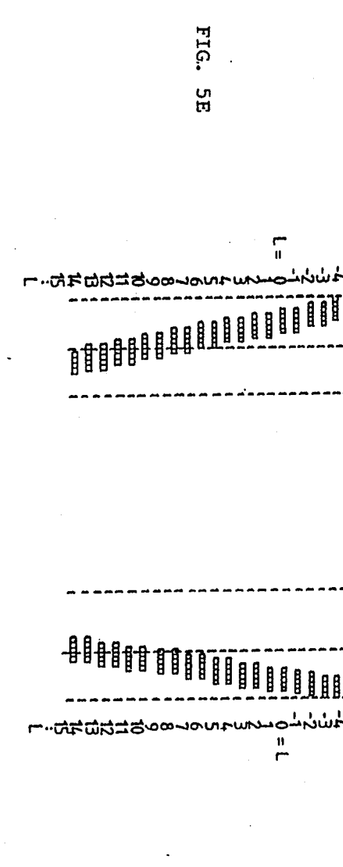
Figure 6:
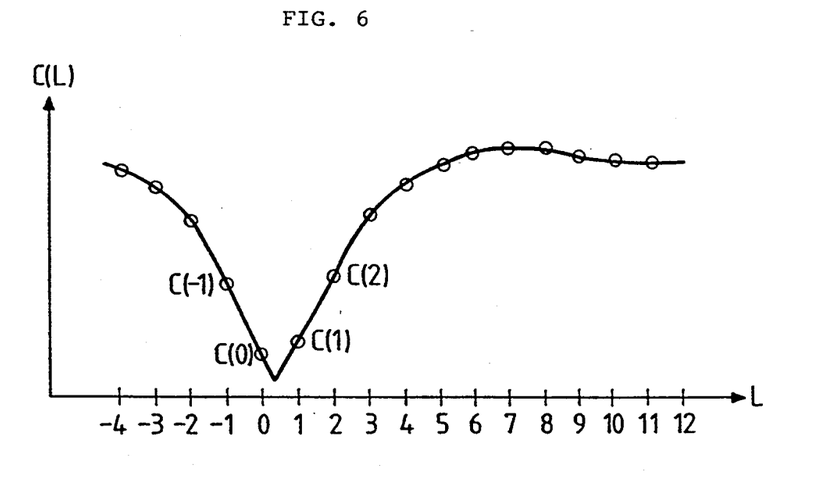
FIG. 6 is a graph showing an image shift calculation.

FIG. 1 is a block diagram of a camera, FIG. 2 is a schematic diagram of a focus detection optical system shown in FIG. 1, FIG. 3 is a detailed diagram of a focus detection apparatus 50 shown in FIG. 2, FIGS. 4A to 4C are explanatory views for explaining detection image regions on an image sensor at different exit pupil positions, respectively, FIGS. 4D to 4G are explanatory views for explaining focus detection regions on a film surface, FIGS. 5A to 5E are explanatory views of an image sensor 6C, and FIG. 6 is a graph showing an image shift calculation.

In FIG. 1, light beams passing through an exit pupil 2 of an exchangeable photographing lens 1 pass through a central semi-transparent portion of a main mirror M, are deflected downward by a sub mirror SM, and then reach a focus detection unit 50. A focus detection plane 3 of the focus detection unit 50 is set at a position optically equivalent to a predetermined imaging plane of the photographing lens corresponding to a film surface F.

The structure of the focus detection unit 50 will be explained below with reference to FIGS. 2 and 3.

A spatial image on the focus detection plane 3 is guided to a chip portion 6 (photoelectric conversion device) where an image sensor 6C is formed via aperture portions A(1), A(2), A(3), A(4), A(5), and A(6).

The image sensor 6C consisting of a large number of pixels for receiving light from the respective aperture portions is provided in the chip portion 6. For the sake of simplicity, the respective image sensor portions are individually denoted by P(1), Q(1), P(2), Q(2), P(3), Q(3), ..., P(6), and Q(6) in accordance with the aperture portions for receiving the small regions on the focus detection plane 3.

In a photographing lens in which an exit pupil position is sufficiently separated from the focus detection plane 3, small regions as a detection image region can be determined as U1, U2, U3, U4, and U5 having x1, x2, x3, x4, and x5 as their central points.

In this case, positions indicated by black dots ● are positions on the image sensor corresponding to the central points x1, x2, x3, x4, and x5 of the respective small regions. In the small regions U1 to U5 having the central points x1 to x5, focus detection free from an eclipse can be performed when images are compared with each other on the regions P(i) and Q(j) of the image sensor portions having black dots indicated by (τ) as their central points.

More specifically, for the small region U1, an image on the image sensor portion P(1) by the aperture portion A(1) of the mask A and an image on the image sensor portion Q(2) by the aperture portion A(2) are compared to perform focusing judgment. For the small region U2, an image on the image sensor portion P(2) by the aperture portion A(2) of the mask A and an image on the image sensor portion Q(3) by the aperture portion A(3) are compared to perform focusing judgment. The same applies to the remaining regions. (Note that P(1), Q(1), P(2), Q(2), P(3), Q(3), . . . , P(6), and Q(6) are arranged as indicated by (τ).)

When the exit pupil position of the photographing lens corresponds to a position P0 in the drawing, small regions as a detection image range are corrected to those having y1, y2, y3, y4, y5, and y6 as their central points.

More specifically, on the image sensor 6C, positions indicated by blank dots ○ are positions on the image sensor corresponding to the central points y1, y2, y3, y4, y5, and y6 of the respective small regions. In these small regions having the central points y1 to y5, focus detection free from an eclipse can be performed when images are compared with each other on the regions P(i) and Q(j) of the image sensor portions having blank dots indicated by (□) as their central points.

More specifically, for the small region having the central point y1, an image on the image sensor portion P(1) by the aperture portion A(1) and an image on the image sensor portion Q(2) by the aperture portion A(2) are compared to perform focusing judgment. For the small region having the central point y2, an image on the image sensor portion P(2) by the aperture portion A(2) of the mask A and an image on the image sensor portion Q(3) by the aperture portion A(3) are compared to perform focusing judgment. The same applies to the remaining regions. (Note that P(1), Q(1), P(2), Q(2), P(3), Q(3), . . . , P(6), and Q(6) are arranged as indicated by (□).)

In this manner, comparison regions for an image shift calculation, i.e., the image sensor portions P(i) and Q(i) are changed like (τ) and (□) described above in accordance with the exit pupil position P0 of the photographing lens and the position of the aperture portion A(i). Therefore, focus detection up to an image range separated from the optical axis in a direction perpendicular to the optical axis can be performed for a photographing lens having an arbitrary exit pupil position.

FIGS. 4E and 4F show changes in corresponding positions of the small regions U1 to U5 on the film surface in correspondence with an exit pupil position of a photographing lens. FIG. 4E shows a case wherein the exit pupil position of the photographing lens is far from the focus detection plane, and FIG. 4F shows a case wherein the exit pupil position is near the focus detection plane. When the exit pupil position is far, a focus detection region obtained as a set of the small regions can be entirely widened.

Determination of Detection Pixel Range

The small regions as the detection image range are determined as follows.

In FIG. 3, when the apertures A(1) and A(2) are used, the small region can be determined to have, as almost the center, an intersection (in FIG. 3, x1 when an exit pupil is infinite, or y1 when an exit pupil is at P0) between the focus detection plane 3 and a straight line connecting an intermediate point A12 between the apertures A(1) and A(2) and a point P0 on the optical axis at the exit pupil position of the photographing lens.

This rule must be strictly applied to a dark lens having a large full-open F number. However, for a bright lens, this rule can be considerably relaxed and wide small regions can be set.

More specifically, in FIG. 4A, a region where a triangle fhg connecting exit pupil edges f and g of the photographing lens, and a center h of the aperture A(1) overlaps a triangle fjg connecting pupil edges f and g, and a center j of the aperture A(2), i.e., a common portion between V2 and V3 of a segment between V1 and V3 and a segment between V2 and V4 corresponds to the maximum size of the small region.

Similarly, in FIG. 4B, a common portion between VV2 and VV3 of a segment between VV1 and VV3, and a segment between VV2 and VV4 corresponds to the maximum size of the small region.

The maximum allowable size of the small region changes depending on a full-open F number of a photographing lens, and a larger small region can be set for a brighter lens having a smaller full-open F number. FIG. 3 exemplifies a case wherein the small regions U1 to U5 have sizes, so that adjacent small regions do not overlap each other. However, adjacent wide small regions may be set to partially overlap each other depending on the full-open F number. FIG. 4G exemplifies a case wherein the small regions overlap each other since a photographing lens is sufficiently bright.

Since the above-mentioned structure is employed, the image sensor portions may be separated and independently arranged in correspondence with re-imaging lenses 5. However, since the way of setting an image shift calculation region is changed in accordance with an exit pupil position of a photographing lens, as described above, the sensor portions are preferably continuously arranged, as shown in FIG. 3, so as to obtain a high degree of freedom.

In FIG. 1, outputs from the image sensor portions P(i) and Q(i) of the focus detection unit 50 are read out by a control means 60. When a partial read method cannot be employed as a read method for a photoelectric conversion device 6 like in a case wherein a CCD transfer unit is used, outputs are simultaneously read out, and are stored in a memory unit of the control means 60.

When photoelectric transducers of the image sensor 6C of the device respectively have memories, and these memories can be randomly accessed, a read region may be changed on the basis of a designation by a region determination means 61.

In this case, since an excessive portion can be prevented from being read out, a read time can be shortened, and the memory area of the control means 60 can be saved.

The control means 60 fetches information associated with optical characteristics of a lens from a lens information storage means 72 in an exchangeable lens, and stores it in its memory unit. As lens information of the lens information storage means 72, most important information associated with an exit pupil position is fetched from an exit pupil position storage means 73, and information associated with a full-open F number is fetched from a full-open F number storage means 74.

The region setting means 61 determines the positions of the image sensor portions P(1), Q(1), P(2), Q(2), P(3), Q(3), . . . , P(6), and Q(6), where an image shift amount can be precisely calculated without an eclipse in a mounted photographing lens using the information associated with the exit pupil position, and the full-open F number information, if necessary.

More specifically, for example, the positions of the image sensor portions are determined by looking up an internal table, as shown in Table 1, on the basis of a position P0 of the exit pupil.

Since Table 1 shows the central pixel positions of the image sensor units, i.e., positions of black and blank dots in FIG. 3 (the number of pixels counted from the edge of the image sensor portion is presented as a pixel address) in accordance with the exit pupil position, each image sensor portion can be determined by adding a predetermined pixel width to before and after the pixel position data. The predetermined pixel width may be a constant value, but is preferably changed depending on a full-aperture F number. In this embodiment, Table 1 is looked up. Of course, a calculation may be directly performed on the basis of the above-mentioned conditions in accordance with the relative positional relationship among the exit pupil position, the aperture position, and the focus detection plane.

Description of Image Shift Calculation Processing

An image shift calculation means 62 calculates an image shift amount near an in-focus point on the basis of image information associated with the same portion of an object included in any of the image sensor portions P(1), Q(1), P(2), Q(2), P(3), Q(3), ..., P(6), and Q(6) set by the region setting means 61 at least when a lens is almost at an in-focus position.

As a method of calculating an image shift amount, various methods are known, and basically, any method may be employed. In this case, there is no problem as long as a method wherein images to be compared always fall within the ranges of the image sensor portions, e.g., P(i) and Q(i+1), set by the region setting means 61 is employed. However, when an image shift amount to be able to be detected is to be increased, image information partially falling outside the image sensor portions P(i) and Q(i+1) can be used, as will be described later. In this case, an image shift amount near an in-focus point must be calculated on the basis of image information associated with the same portion of an object included in any of the image sensor portions P(1), Q(1), P(2), Q(2), P(3), Q(3), ..., P(6), and Q(6) set by the region setting means 61 at least when a lens is almost at an in-focus position.

This respect will be explained below with reference to FIGS. 5A to 5E. FIG. 5A is an enlarged view of the chip portion 6 shown in FIG. 4C.

In a photographing lens whose exit pupil is near the focus detection plane (FIG. 4A), light passing through the pupil becomes incident on portions between v3 and v1, and between v4 and v2 on the image sensor 6C, and FIG. 5B shows a light amount distribution at that time. In a photographing lens whose exit pupil is far from the focus detection plane (FIG. 4B), light passing through the pupil becomes incident on portions between vv3 and vv1, and between vv4 and vv2 on the image sensor, and FIG. 5D shows a light amount distribution at that time.

Of these portions, since an overlapping portion on the focus detection plane 3 corresponds to a range between V2 and V3 in FIG. 4A, the region setting means 61 sets regions between v3 and v2' and between v3' and v2 as image sensor portions P(7) and Q(8) on the image sensor 6C.

When the exit pupil position of the photographing lens is changed, portions capable of detecting an image shift are largely changed. In FIG. 4B, since an overlapping portion on the focus detection plane 3 corresponds to a range between VV2 and VV3, the region setting means 61 sets regions between vv3 and vv2' and between vv3' and vv2 as image sensor portions P(7)' and Q(8)' on the image sensor 6C.

FIGS. 5C and 5E show the numbers of image comparison pixels, and shift methods in image shift calculations shown in FIGS. 5B and 5D. In FIGS. 5C and 5E, the numbers of image comparison pixels are respectively set to be 3 and 5 due to the limited space on the drawing sheet. Of course, the present invention is not limited to these.

In the shift method, as shown in FIGS. 5C or 5E, a comparison pixel is sequentially and alternatively shifted pixel by pixel from a reference position L=0. The number L of relatively shifted pixels corresponds to a shift amount L.

In FIG. 5C, a shift range of about ±3 before and after L=0 falls within the range of the predetermined image sensor portions P(7) and Q(8) set by the region setting means 61, and hence, the same portion on the focus detection plane 3 is detected. Within the above-mentioned shift range, the image shift calculation means 62 can perform precise focusing judgment.

When L>8 in FIGS. 5C and 5E, shifted pixels clearly fall outside the range of the image sensor portions P(7) and Q(8). However, a large defocus state can be detected in this state.

As is well known, the image shift calculation means 62 calculates the absolute value of the difference between pixel outputs at positions corresponding to image comparison pixels of each shift number L, and then calculates a sum of the absolute values of all the pixel pairs of the number of image comparison pixels, thereby calculating a correlation amount C(L).

FIG. 6 shows the correlation amount C(L) while the shift number L is plotted along the abscissa. The image shift calculation means 62 calculates a shift number having the best correlation (corresponding to an image shift amount) as well as a fraction by a method described in, e.g., Japanese Laid-Open Patent Application No. 60-37513. The image shift amount calculated in this manner is represented by L0.

It is difficult to perform adjustment so that a shift number giving the best correlation is set to always yield L=0 when the best image plane of the photographing lens is present on the focus detection plane. In practice, therefore, after an optical system is adjusted so that a shift number giving the best correlation is set near L=0, the remaining fine zero-point adjustment is preferably corrected by calculation.

A correction means 63 is arranged for this purpose. Zero-point correction of an image shift amount is performed while looking up a $\Delta L$ table, as shown in Table 2, written in, e.g., an EEPROM during adjustment for each camera body, thereby calculating a corrected image shift amount L0-$\Delta L$.

When the image shift amount corrected to have an in-focus position as a zero point is calculated in this manner, a defocus amount calculation means 64 multiplies the corrected image shift amount with a predetermined conversion coefficient to calculate a defocus amount, as is well known.

The defocus amount calculation means 64 calculates the defocus amount for at least one small region, and when there are a plurality of defocus amounts, the means 64 determines one final defocus amount on the basis of a predetermined method (e.g., selects the closest one).

A drive/display means 65 drives a lens and performs focus indication by a known method on the basis of the final defocus amount.

Some variations of the present invention will be described below.

Figure 7:
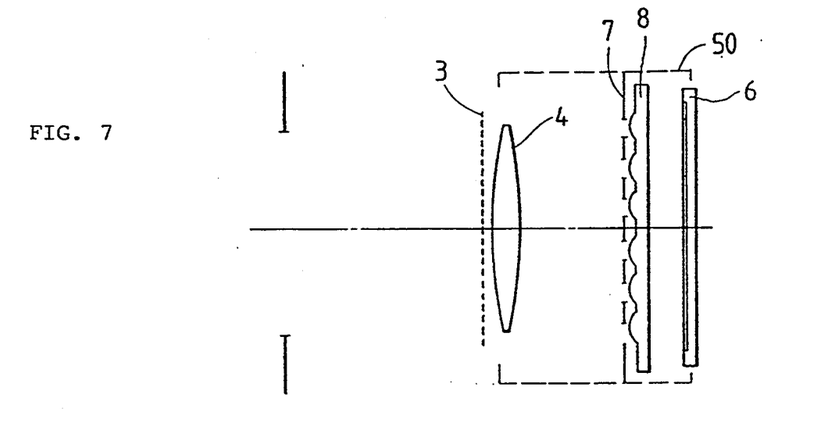
FIGS. 7 to 10 are schematic diagrams of a focus detection optical system.

FIG. 7 shows lens portions 5 of aperture portions A(1) to A(6) separated into a lens array 8 and an aperture mask 7 in a manner close to that in an actual system. The aperture mask 7 serves to prevent unnecessary light from becoming incident on a chip portion 6 where an image sensor is formed.

Figure 8:
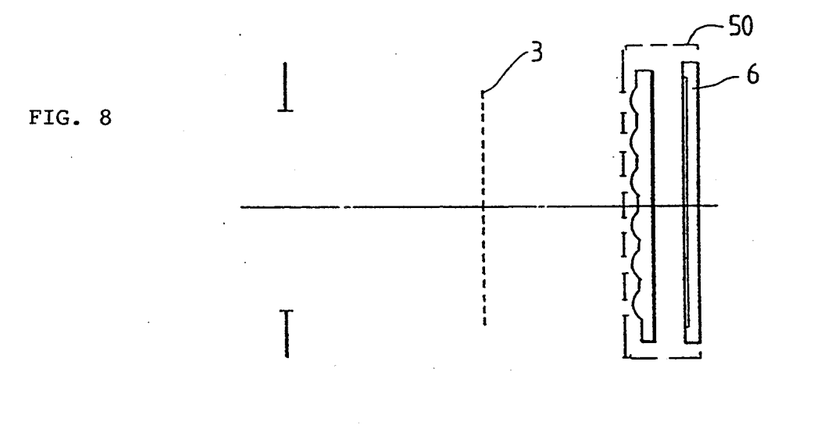

FIG. 8 shows an embodiment wherein a field lens 4 is excluded from the case shown in FIG. 7. This embodiment has a merit in that a focus detection apparatus 50 can be rendered more compact.

Figure 9:
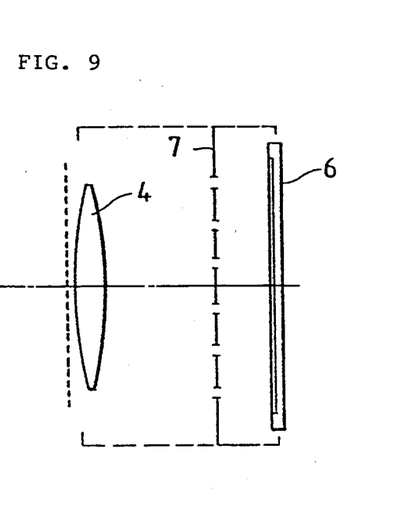

FIG. 9 shows a case wherein the lens array 8 is excluded from the case shown in FIG. 8. In this case, a pinhole imaging effect of the aperture mask 7 is utilized.

Figure 10:
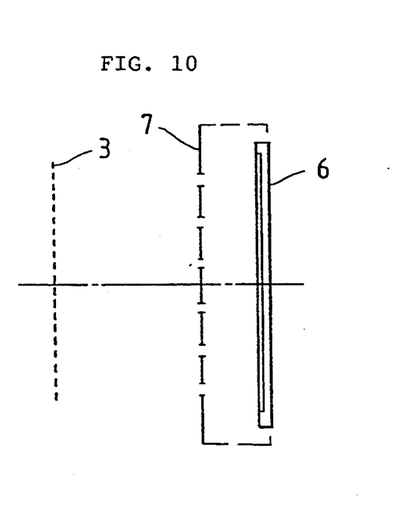

FIG. 10 shows a case wherein a field lens 4 is excluded from the case shown in FIG. 9, i.e., the simplest embodiment of the present invention, which utilizes a pinhole imaging effect.

Note that to re-forming an image on the focus detection plane 3 on the image sensor 6C is a necessary condition. However, no strict conjugate relationship is required between the two images since image shift detection can be performed as long as a density pattern of a light amount is formed on the image sensor.

Figure 11:
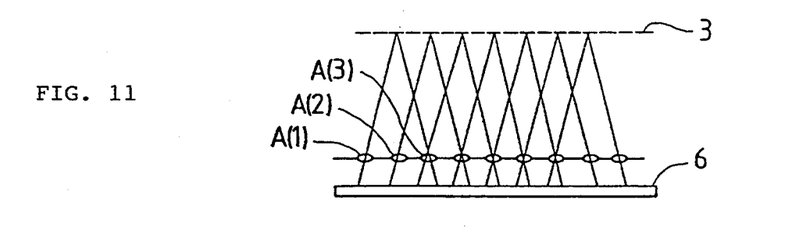
FIG. 11 is a diagram showing an optical path of a focus detection system associated with a focus detection plane 3.

In FIG. 11, image shift detection is performed for an image associated with every other aperture for the purpose of focus detection associated with the focus detection plane 3. In this manner, image shift detection may be performed for images associated with two apertures sandwiching at least one aperture therebetween.

Figure 12:
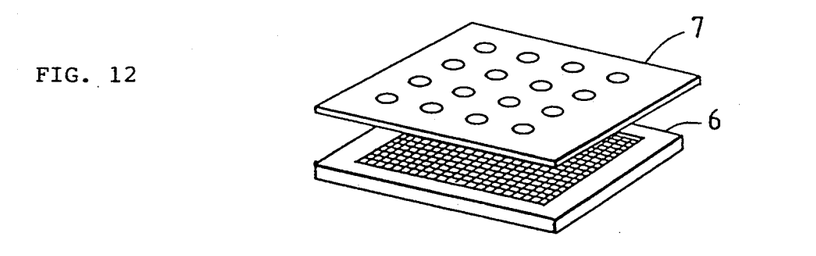
FIG. 12 is an explanatory view when a two-dimensional image sensor is used.

In FIG. 12, the above-mentioned focus detection is performed two-dimensionally, and this system includes at least a mask plate 7 on which aperture portions are two-dimensionally arranged, and a two-dimensional image sensor 6. Of course, a lens array may be arranged near the mask plate, as has already been described with reference to a linear system, or a field lens may be arranged near the focus detection plane 3 or between the focus detection plane and the mask plate.

In both the linear and two-dimensional systems, a pitch of the aperture portions need not always be constant. The present applicant filed another application in which focus detection for a periodic pattern, which cannot be detected in a conventional system, can be performed by intentionally varying a pitch.

Figure 13:
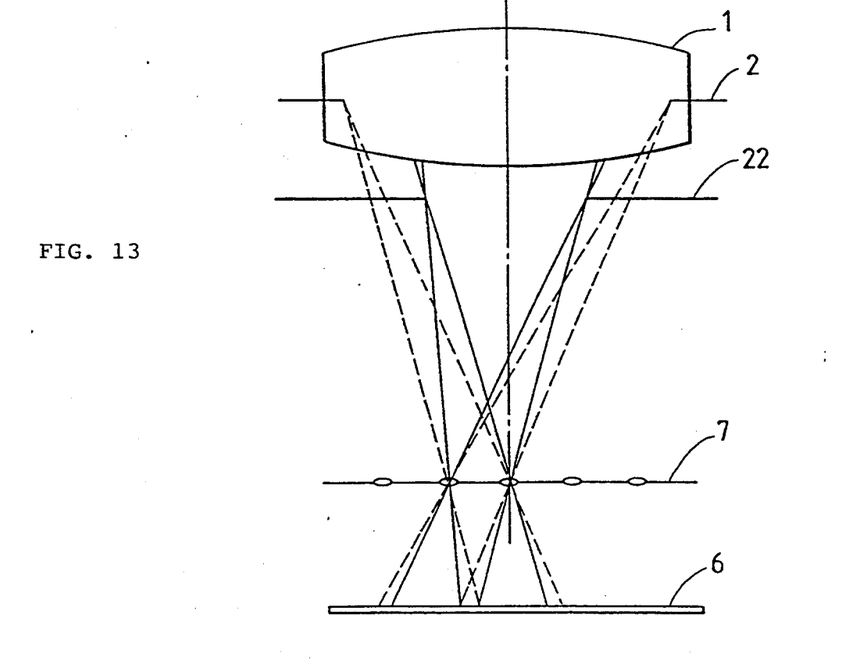
FIG. 13 is an explanatory view for explaining an arrangement of an aperture stop member of a focus detection optical system.

FIG. 13 shows a countermeasure against a problem posed when a photographing lens is very bright (F number is small). When the photographing lens is very bright, the diameter of an aperture 2 of an exit pupil is large, and transmission light beams are diverged, as indicated by dotted lines. Therefore, light beams associated with adjacent apertures partially overlap each other on an image sensor 6.

Such a problem can be solved by inserting an aperture stop member 22 in an optical path, as shown in FIG. 13. The position of the aperture stop member 22 upon lens mounting on a camera can be determined by appropriately determining the size of the sub mirror SM in FIG. 1, or by appropriately determining the aperture diameter of the central transmission portion of the main mirror M.

The relationship with a power of a field lens 4 in the embodiment of the present invention will be described below.

Figure 16:
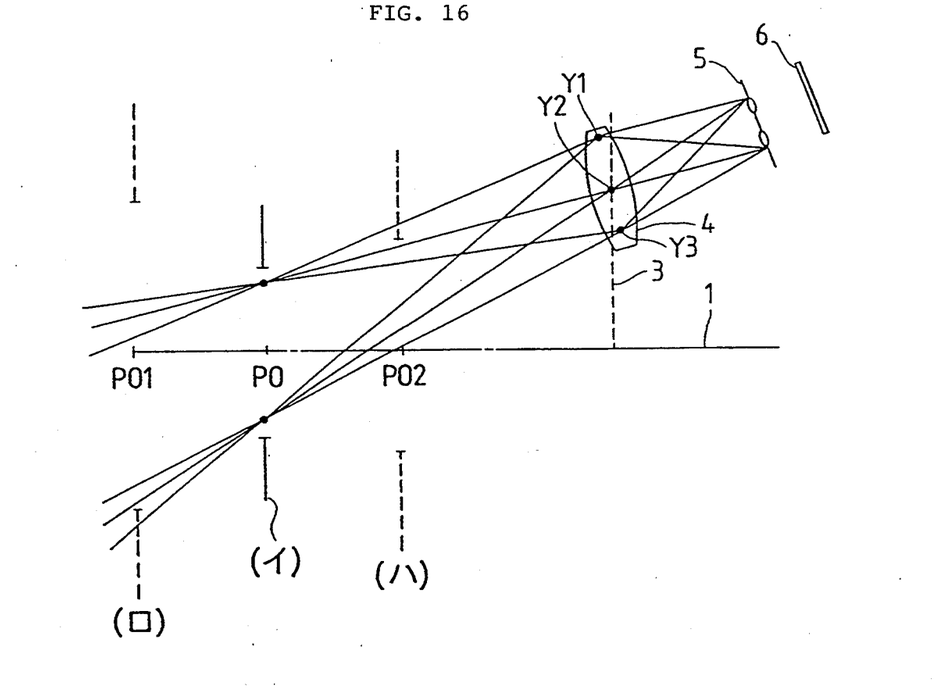
FIGS. 16 and 17 are explanatory views for explaining a field lens power of a focus detection apparatus according to the present invention.

As has been described in the principle of the present invention with reference to FIG. 4 (no field lens), the present invention does not always require a field lens. However, a system using a field lens will be described below with reference to FIG. 16. In FIG. 16, the power of a field lens 4 arranged near the focus detection plane 3 is determined so that a typical exit pupil position P0 of an exchangeable photographing lens is conjugate with the position of the re-imaging optical system 5.

As a result, when the exit pupil position is located at the position P0 as indicated by (τ) in FIG. 16, focus detection free from an eclipse can be performed in all the focus detection regions Y1, Y2, and Y3.

In contrast to this, in a photographing lens in which the exit pupil position is located at a position. P01, as indicated by (□) in FIG. 16, the focus detection region between Y1 and Y2 cannot be used due to an eclipse, and focus detection can be performed in a portion between Y2 and Y3.

In a photographing lens in which the exit pupil position is located at a position P02, as indicated by ($\wedge$ in FIG. 16, the focus detection region between Y1 and Y2 cannot be used due to an eclipse, and focus detection can be performed in the portion between Y2 and Y3.

Therefore, a table for storing ranges free from an eclipse is prepared in a storage means in a camera body in correspondence with full-open F numbers and exit pupil positions, and a full-open F number and an exit pupil position of a photographing lens are read to look up the table, thus selecting a region free from an eclipse, and allowing focus detection. Such a table may be realized by preparing a plurality of tables like (Table 1) in units of full-open F numbers.

As described above, possibility of focus detection can be increased in FIG. 16. As can be seen from FIG. 16, when the exit pupil position of the photographing lens is located at P01 or P02, light beams on one side, i.e., below or above the exit pupil must be used in focus detection. In addition, since the aberration of the photographing lens is increased around the pupil, focus detection precision is decreased under the influences of the increase in aberration.

Figure 17:
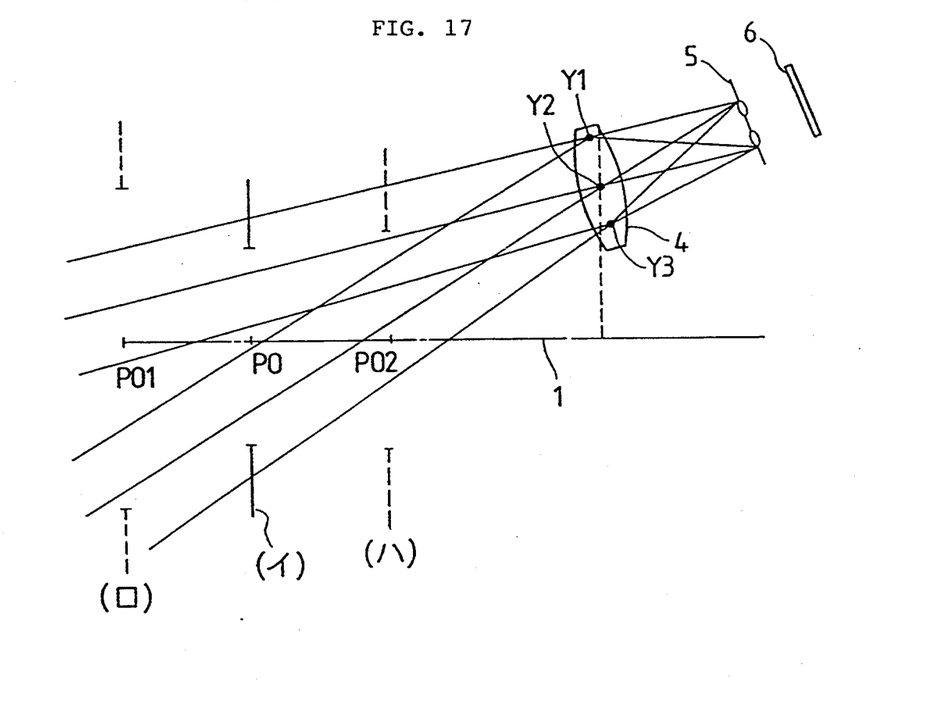

A system for solving this problem will be described below with reference to FIG. 17. In FIG. 17, when a field lens power is determined, for light beams passing through the re-imaging optical system 5, a light beam passing near the focus detection region Y1 is caused to pass almost the center of an exit pupil located at P01, a light beam passing near the focus detection region Y2 is caused to pass almost the center of an exit pupil located at P0, and a light beam passing near the focus detection region Y3 is caused to pass almost the center of an exit pupil located at P02. A table which defines optimal focus detection regions in accordance with exit pupil positions of the photographing lens like (Table 1) is stored in a camera body, so that an exit pupil position of each photographing lens is read to look up the table, thereby setting focus detection regions near the designated regions Y1, Y2, Y3, and the like. Therefore, since focus detection can be performed using light beams near the center of the pupil of the photographing lens, detection precision can be improved.

Effect of Invention

As described above, according to the present invention, small regions as a detection image range are set in accordance with an exit pupil position and the distance between the optical axis of a photographing lens and an aperture position of a focus detection apparatus, and focus detection is performed on the basis of photoelectric outputs from image sensor units on which images of the small regions are formed. Thus, an apparatus which can precisely perform focus detection regardless of an exit pupil position can be provided.

A large number of aperture portions of a focus detection apparatus are provided, and image shift calculation regions P(i) and Q(i+s) on the image sensor 6C are changed by a region changing means in accordance with an exit pupil position and the distances between the optical axis of a photographing lens and the aperture portions, and a focus detection calculation is formed in the respective small regions. Thus, a wide focus detection region can be covered as a whole. In this case, the focus detection apparatus 50 can be rendered compact as compared to a conventional re-imaging type apparatus (the focus detection apparatus 30 shown in FIG. 14), and focus detection in a region separated from the optical axis of a photographing lens in a direction perpendicular to the optical axis, which cannot be performed in the conventional apparatus, can be performed.

TABLE 1

| Detection Image Range U | | Exit Pupil Position P0 | | | |
|---|---|---|---|---|---|
| | | 50 to 67 mm | 67 to 100 mm | 100 to 200 mm | from 200 mm |
| 1 | P(1) | 7 pixel address | 8 | 9 | 10 |
| | Q(2) | 29 | 30 | 31 | 32 |
| 2 | P(2) | 25 | 25 | 26 | 26 |
| | Q(3) | 47 | 47 | 48 | 48 |
| 3 | P(3) | 42 | 42 | 42 | 42 |
| | Q(4) | 64 | 64 | 64 | 64 |
| 4 | P(4) | 59 | 59 | 58 | 58 |
| | Q(5) | 81 | 81 | 80 | 80 |
| 5 | P(5) | 77 | 76 | 75 | 74 |
| | Q(6) | 99 | 98 | 97 | 96 |

TABLE 2

| Detection Image Range U | ΔL Table | | | |
|---|---|---|---|---|
| | Exit Pupil Position P0 | | | |
| | 50 to 67 mm | 67 to 100 mm | 100 to 200 mm | from 200 mm |
| 1 | 0.34 pixel | 0.56 pixel | −0.12 pixel | −0.88 pixel |
| 2 | 1.23 | −0.22 | 0.76 | 0.09 |
| 3 | 0.44 | −0.65 | 0.34 | 0.54 |
| 4 | −0.76 | −0.33 | 0.76 | 1.13 |
| 5 | −0.98 | 0.04 | 0.41 | 0.93 |

I claim:

1. A focus detection apparatus which comprises at least three aperture portions behind a predetermined imaging plane of a photographing lens, and an image sensor portion arranged behind the at least three aperture portions, and having a plurality of photoelectric elements for detecting a plurality of light amount distributions by a plurality of light beams passing through the aperture portions, and which calculates an image shift amount on the predetermined imaging plane using photoelectric outputs from said plurality of photoelectric elements to perform focus detection, characterized by comprising:

first image shift calculation means for calculating a relative shift amount of images on the basis of a light amount distribution of a first portion of the light amount distribution associated with a light beam passing through the first aperture portion, and a light amount distribution associated with a light beam passing through the second aperture portion; and second image shift calculation means for calculating a relative shift amount of images on the basis of a light amount distribution of a second portion, which is different from the first portion although the second portion is allowed to partially overlap the first portion, in the light amount distribution associated with the light beam passing through the first aperture portion, and a light amount distribution associated with a light beam passing through the third aperture portion different from the first and second aperture portions, and characterized in that focus detection is performed on the basis of a result from at least one of said first and second image shift calculation means.

2. A focus detection apparatus characterized by comprising:

an image sensor portion which has at least three aperture portions for receiving light from an object, and if the aperture portions are represented by A(1), A(2), A(3), . . . , A(n), comprises an image sensor portion P(i) arranged behind the aperture portions, and having a plurality of photoelectric elements for detecting a first portion of a light amount distribution by light beams passing through the aperture portions A(i), and an image sensor portion Q(i) having a plurality of photoelectric elements for detecting a second portion of the light amount distribution, said image sensor portions being arrayed in the order of P(1), Q(1), P(2), Q(2), P(3), Q(3), . . . , P(n), and Q(n); and image shift calculation means for, when a predetermined positive integer is represented by s, calculating a relative shift amount of images on the basis of an image output from the image sensor portion P(i) and an image output from the image sensor portion Q(i+s), and characterized in that said image shift calculation means calculates an image shift amount on the basis of a pair of photoelectric outputs associated with at least one i to perform focus detection.

3. A focus detection apparatus which comprises at least three aperture portions behind a predetermined imaging plane of a photographing lens, and an image sensor portion arranged behind the at least three aperture portions, and having a plurality of photoelectric elements for detecting a plurality of light amount distributions by a plurality of light beams passing through the aperture portions, and which calculates an image shift amount on the predetermined imaging plane using photoelectric outputs from said plurality of photoelectric elements to perform focus detection, characterized by comprising:

first image shift calculation means for calculating a relative shift amount of images on the basis of a light amount distribution associated with a light beam passing through the first aperture portion, and a light amount distribution associated with a light beam passing through the second aperture portion, and second image shift calculation means for calculating a relative shift amount of images on the basis of a light amount distribution associated with the light beam passing through the first aperture portion, and a light amount distribution associated with a light beam passing through the third aperture portion different from the first and second aperture portions, the third aperture portion being not located on a line connecting between the first aperture portion and the second aperture portion, and characterized in that focus detection is performed on the basis of a result from at least one of said first and second image shift calculation means.

4. A focus detection apparatus which comprises at least three aperture portions behind a predetermined imaging plane of a photographing lens, and an image sensor portion arranged behind the at least three aperture portions, and having a plurality of photoelectric elements for detecting a plurality of light amount distributions by a plurality of light beams passing through the aperture portions, and which calculates an image shift amount on the predetermined imaging plane using photoelectric outputs from said plurality of photoelectric elements to perform focus detection, characterized by comprising:

first image shift calculation means for calculating a relative shift amount of images on the basis of a light amount distribution of a first portion on the image sensor associated with a light beam passing through the first aperture portion, and a light amount distribution of a second portion on the image sensor associated with a light beam passing through the second aperture portion; and second image shift calculation means for calculating a relative shift amount of images on the basis of a light amount distribution of a third portion on the image sensor associated with the light beam passing through the first aperture portion, and a light amount distribution of a fourth portion on the image sensor associated with a light beam passing through the third aperture portion different from the first and second aperture portions, and characterized in that focus detection is performed on the basis of a result from at least one of said first and second image shift calculation means.

5. A focus detection apparatus according to claim 4, wherein at least one of said first, second, third and fourth portions varies its position depending on lens information of the photographing lens.

6. A focus detection apparatus according to claim 4, wherein at least one of said first, second, third and fourth portions varies its position depending on lens characteristics of the photographing lens.

* * * * *